(12) United States Patent
Milne et al.

(10) Patent No.: US 11,336,544 B2
(45) Date of Patent: May 17, 2022

(54) HDMI SYSTEM SPEED TEST

(71) Applicant: Sony Group Corporation, Tokyo (JP)

(72) Inventors: James R. Milne, Ramona, CA (US); Tomohiro Koyata, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/066,425

(22) Filed: Oct. 8, 2020

(65) Prior Publication Data

US 2022/0116293 A1    Apr. 14, 2022

(51) Int. Cl.
*H04L 43/06* (2022.01)
*H04L 41/0803* (2022.01)
*H04L 43/00* (2022.01)
*H04L 65/60* (2022.01)
*H04L 43/04* (2022.01)

(52) U.S. Cl.
CPC ........ *H04L 43/06* (2013.01); *H04L 29/06476* (2013.01); *H04L 41/0803* (2013.01); *H04L 43/04* (2013.01); *H04L 43/14* (2013.01); *H04L 65/60* (2013.01)

(58) Field of Classification Search
None
See application file for complete search history.

(56) References Cited

U.S. PATENT DOCUMENTS

| | | | | |
|---|---|---|---|---|
| 4,821,223 A | * | 4/1989 | David ................ | H03H 17/0202 708/308 |
| 7,283,594 B1 | * | 10/2007 | Wood .................... | H04L 5/1423 375/278 |
| 7,444,483 B2 | * | 10/2008 | Taguchi ................ | G06F 1/3268 711/156 |
| 8,842,185 B1 | | 9/2014 | Spears et al. | |
| 8,860,774 B1 | * | 10/2014 | Sheeley ................... | H04N 7/15 348/14.04 |
| 9,160,644 B1 | * | 10/2015 | Softer ..................... | H04L 43/50 |
| 9,185,116 B2 | * | 11/2015 | Wong .................. | H04L 65/4084 |
| 9,565,427 B1 | | 2/2017 | Blake et al. | |
| 2010/0251030 A1 | * | 9/2010 | Astigarraga ........ | G06F 11/2221 714/43 |
| 2011/0249574 A1 | * | 10/2011 | Karacali-Akyamac ..................... | H04L 41/145 370/252 |

(Continued)

FOREIGN PATENT DOCUMENTS

| | | | | | |
|---|---|---|---|---|---|
| JP | 2000278722 A | * | 10/2000 | ........... | G06T 7/0002 |
| WO | WO-2018012020 A1 | * | 1/2018 | ............... | H04N 5/46 |
| WO | WO-2018181120 A1 | * | 10/2018 | ......... | G05B 19/0428 |

*Primary Examiner* — Lance Leonard Barry
(74) *Attorney, Agent, or Firm* — Trellis IP Law Group, PC (57) ABSTRACT

A method of assessing at least one of audio and video HDMI performance capabilities of an AV system including one or more sources and one or more sinks, interconnected in a first configuration comprises using an app running on a smart device, wirelessly connected to the AV system, to present audio and/or video performance capability information for each source and sink to a user of the system, based on EDID information received by the smart device from each source and sink.

In one embodiment, the app also presents a determination of maximum theoretical data handling capacity of the AV system in the first configuration; runs a test to assess actual data handling capacity of the AC system in the first configuration; and presents one or more results of the test to the user.

3 Claims, 6 Drawing Sheets

(56) References Cited

U.S. PATENT DOCUMENTS

| | | | |
|---|---|---|---|
| 2014/0118794 A1* | 5/2014 | Seo | H04N 1/0001 |
| | | | 358/406 |
| 2014/0122656 A1* | 5/2014 | Baldwin | H04L 65/80 |
| | | | 709/219 |
| 2014/0226026 A1 | 8/2014 | Claramond et al. | |
| 2015/0036532 A1* | 2/2015 | Osterloh | H04L 43/50 |
| | | | 370/252 |
| 2015/0042887 A1* | 2/2015 | Schanin | H04N 21/43635 |
| | | | 348/706 |
| 2015/0319485 A1* | 11/2015 | Vedula | H04N 21/6437 |
| | | | 725/74 |
| 2016/0253446 A1* | 9/2016 | Chong | G06F 30/367 |
| | | | 716/136 |
| 2017/0054770 A1* | 2/2017 | Wells | H04L 65/1006 |
| 2017/0134255 A1* | 5/2017 | Amini | H04L 43/16 |
| 2017/0339630 A1* | 11/2017 | Ketonen | H04W 24/08 |
| 2018/0160160 A1* | 6/2018 | Swaminathan | H04N 21/8456 |
| 2018/0338278 A1* | 11/2018 | Ketonen | H04W 48/20 |
| 2019/0373539 A1* | 12/2019 | Chen | H04W 48/16 |
| 2020/0053311 A1* | 2/2020 | Ogiso | H04N 5/46 |
| 2020/0228210 A1* | 7/2020 | Lapierre | H04W 24/04 |
| 2020/0409766 A1* | 12/2020 | Fang | G06F 13/4022 |

\* cited by examiner

HDMI SYSTEM SPEED TEST

BACKGROUND

A user of an HDMI audio-video (AV) system may be interested in determining the performance capability of the system, determined in part on the intrinsic characteristics of system components, particularly signal sources and sinks, but also in part on the particular configuration in which those components are interconnected to make up the system. A key quantitative metric characterizing system performance in this context is the highest effective data rate that can be handled while providing a user experience of acceptable quality.

Data rates may be expressed by corresponding speed categories, such as standard, high speed, premium, ultra, etc. The actual data rates achievable for HDMI video transmission depend on four parameters: color bit depth, chroma format, resolution, and frame rate. Typical values of color bit depth are 8, 10, 12, or 16-bit data; typical chroma formats include 4:2:0, 4:2:2, and 4:4:4; typical resolution values include 2K, 4K, and 8K; and typical frame rates include 24 fps, 30 fps, and 60 fps. The audio data rate depends on the audio format(s) that are available in the source material (i.e., Dolby Atmos, DTS X, Auro 3D, or linear PCM). Achievable audio data rates in HDMI systems vary according to system configuration, as well as whether an audio return channel (ARC) capability, or an enhanced audio return (eARC) capability is a feature of audio-handling elements of the system.

Tables published by the HDMI organization and included in the HDMI specifications provide listings for video data of various combinations of parameters the effective data rates and the speed categories into which they may be considered to fall. So, for example, a "standard" speed device could handle the 0.81 Gbps effective data rate SD resolution of 480/60i fps at chroma 4:2:0, and color depth 8, while a "high" speed device is needed to handle the 11.14 Gbps effective data rate of UHD resolution of 4K/24-30 fps, with chroma of 4:4:4 RGB, and color depth 10, and an "ultra" speed device for the 48.11 Gbps data rate of resolution 8K/24-30 fps, chroma of 4:4:4 RGB, and color depth 12.

Currently, a trained technician using specialized test equipment is typically required to run the sort of tests necessary to determine HDMI system performance capability. In many routine or standard situations, considerations of cost, time, and inconvenience make this option undesirable. There is therefore a need to provide methods and systems that allow a non-expert user, such as a system installer, or the customer owning the system, to conduct basic tests on an HDMI AV system without needing either a trained test engineer or access to special test equipment on site in real time.

As smart devices such as smartphones are increasingly ubiquitous, the idea of making use of the communication, processing, and display capabilities of such a device, already in the user's possession, is particularly attractive. This might allow users to test their own home system whenever they choose, without incurring any costs beyond the use of their own time, which would hopefully be of short duration. Embodiments described below depend on applications that would run on the smart device with minimal demands on user interaction, essentially just requiring the user to request a HDMI performance capability test, input some very basic information, and view the results.

Ideally, the results provided by the envisaged methods and systems would be sufficiently informative, presented in an easy-to-understand format, for the user to react appropriately. In particular, it would be desirable if the results made it clear to the user whether performance would be significantly improved by a relatively simple reconfiguration of the system connections for a given application. In cases where the results show that one (or more) of the components themselves is inadequate for the user's needs, of course, the user might decide to replace that component with another, in which case further guidance might be provided.

SUMMARY

Embodiments generally relate to methods and systems to create an HDMI system data rate (speed) test that enables a user to easily and conveniently check achievable performance from a given HDMI AV system, and optionally reconfigure the system to optimize that performance.

In one embodiment, a method is disclosed that assesses at least one of audio and video HDMI performance capabilities of an AV system including one or more sources and one or more sinks, interconnected in a first configuration. The method comprises using an app running on a smart device, wirelessly connected to the AV system, to: present audio and/or video performance capability information for each source and sink to a user of the system, based on EDID information received by the smart device from each source and sink; present a determination of maximum theoretical data handling capacity of the AV system in the first configuration; run a test to assess actual data handling capacity of the AC system in the first configuration; and present one or more results of the test to the user.

In another embodiment, an apparatus is disclosed that assesses at least one of audio and video HDMI performance capabilities of an AV system including one or more sources and one or more sinks, interconnected in a first configuration. The apparatus comprises one or more processors in a smart device; and a software app encoded in one or more computer-readable media for execution by the one or more processors and when executed operable to: present audio and/or video performance capability information for each source and sink to a user of the system, based on EDID information received by the smart device from each source and sink; present a determination of maximum theoretical data handling capacity of the AV system in the first configuration; run a test to assess actual data handling capacity of the AC system in the first configuration; and present one or more results of the test to the user.

A further understanding of the nature and the advantages of particular embodiments disclosed herein may be realized by reference of the remaining portions of the specification and the attached drawings.

DETAILED DESCRIPTION OF EMBODIMENTS

Embodiments described herein are directed to the assessment of HDMI performance of AV systems, connected in video centric or audio-centric configurations. The present invention uses an application to guide a user to perform a few easy steps, avoiding the need for specialized test equipment operated by a technical expert. In most embodiments, the application will run on a smart device already in the user's possession. In some cases a custom installer may provide a smart device to their customer to control the system.

Figure 1:
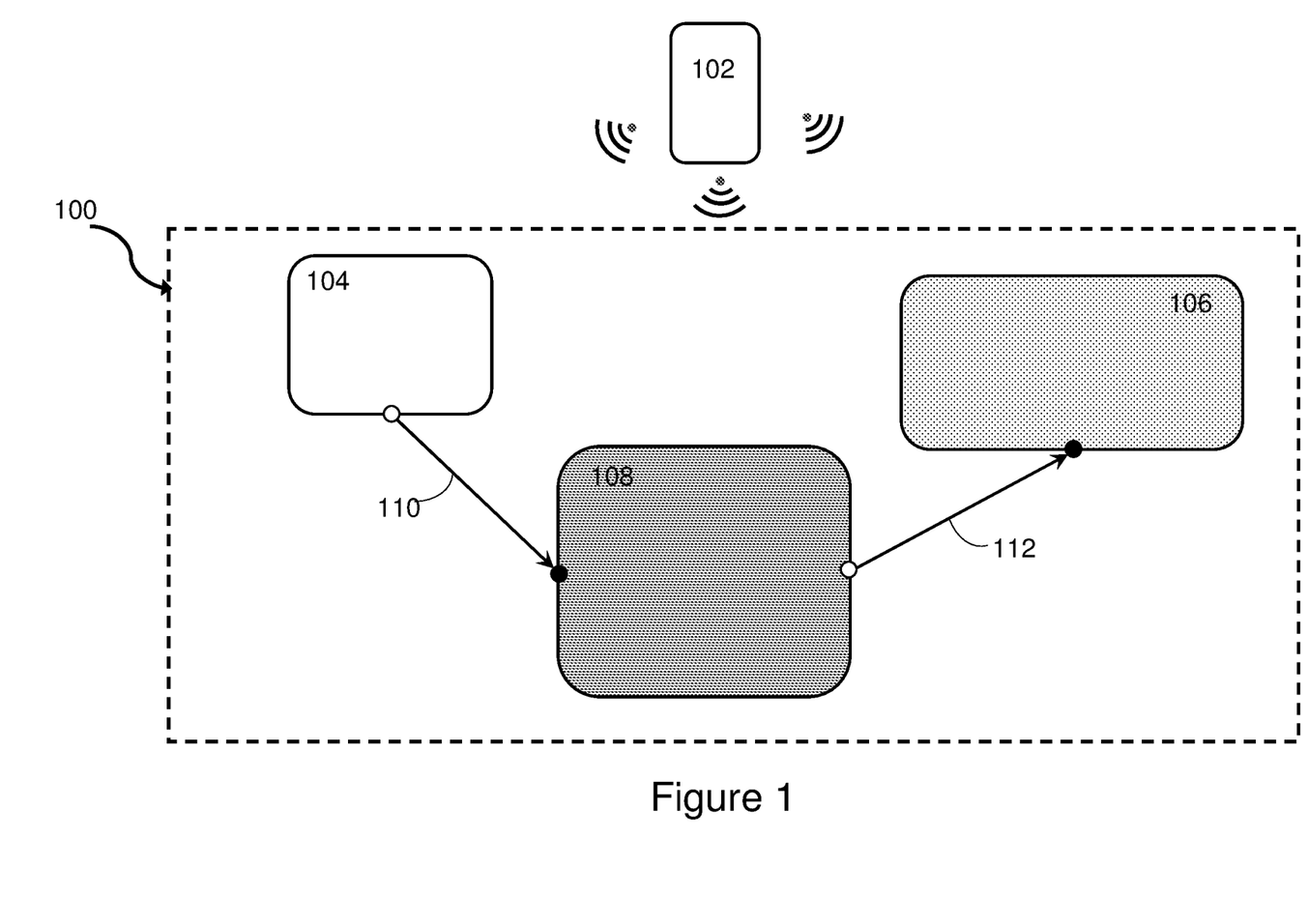
FIG. 1 illustrates a system for assessing HDMI performance capability of a video-centric AV system according to one embodiment.

FIG. 1 schematically illustrates a video-centrically connected AV system 100 including a primary system source 104, a primary system sink 106, and an intermediate component 108 acting as a video sink and an audio source to sink 106. In an exemplary case, source 104 may be a set-top box, intermediate component 108 a TV, and sink 106 a sound bar. In other embodiments, source 104 may be a Blu-ray player, an UHD player, or a streaming box like AppleTV or Roku, 108 may be a display other than a TV screen, and 106 another type of audio receiver/speaker, and there may be additional sources and sinks within system 100. A smart device 102, typically a smart phone or tablet, is in wireless communication with all three components 104, 106, and 108 under the control of an application installed in the smart device. The sources and sinks in the system may include corresponding preloaded or downloaded thin-client type applications, for which updates may be downloadable as necessary.

Connecting cables 110 and 112 are HDMI cables, with cable 110 being required to carry high speed data, while cable 112 only needs to carry relatively low speed data. However, for maximum reconfiguration flexibility, both cables may be equally capable of carrying high speed data.

Figure 2:
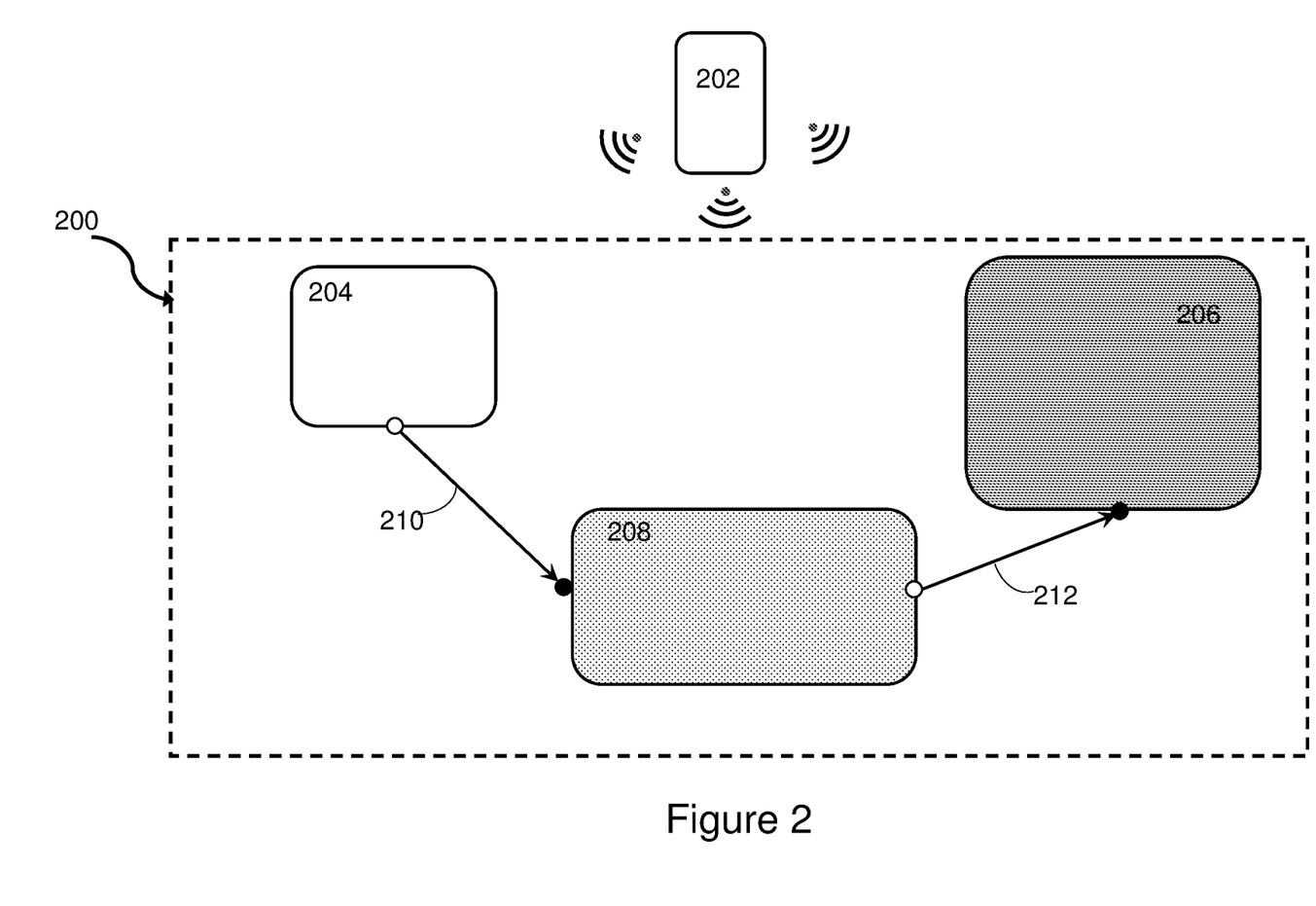
FIG. 2 illustrates a system for assessing HDMI performance capability of an audio-centric AV system according to one embodiment.

FIG. 2 schematically illustrates an audio-centrically connected AV system 200 including a primary system source 204, a primary system sink 206, and an intermediate component 208 acting as an audio sink and an intermediate video source to sink 206. In an exemplary case, source 204 may be a set-top box, intermediate component 208 may be a sound bar, and sink 206 may be a TV, but as noted above, other examples of devices performing similar functions, and other related devices, may be present in other embodiments. A smart device 202, typically a smart phone or tablet, is wireless communication with all three components 204, 206, and 208 under the control of an application installed in the smart device. The sources and sinks in the system may include corresponding preloaded or downloaded thin-client type applications.

Connecting cables 210 and 212 are HDMI cables, but in this case, in contract to the set up shown in FIG. 1, both cables are required to carry high speed data, as video data streams are not dropped at the intermediate component 208.

Figure 3:
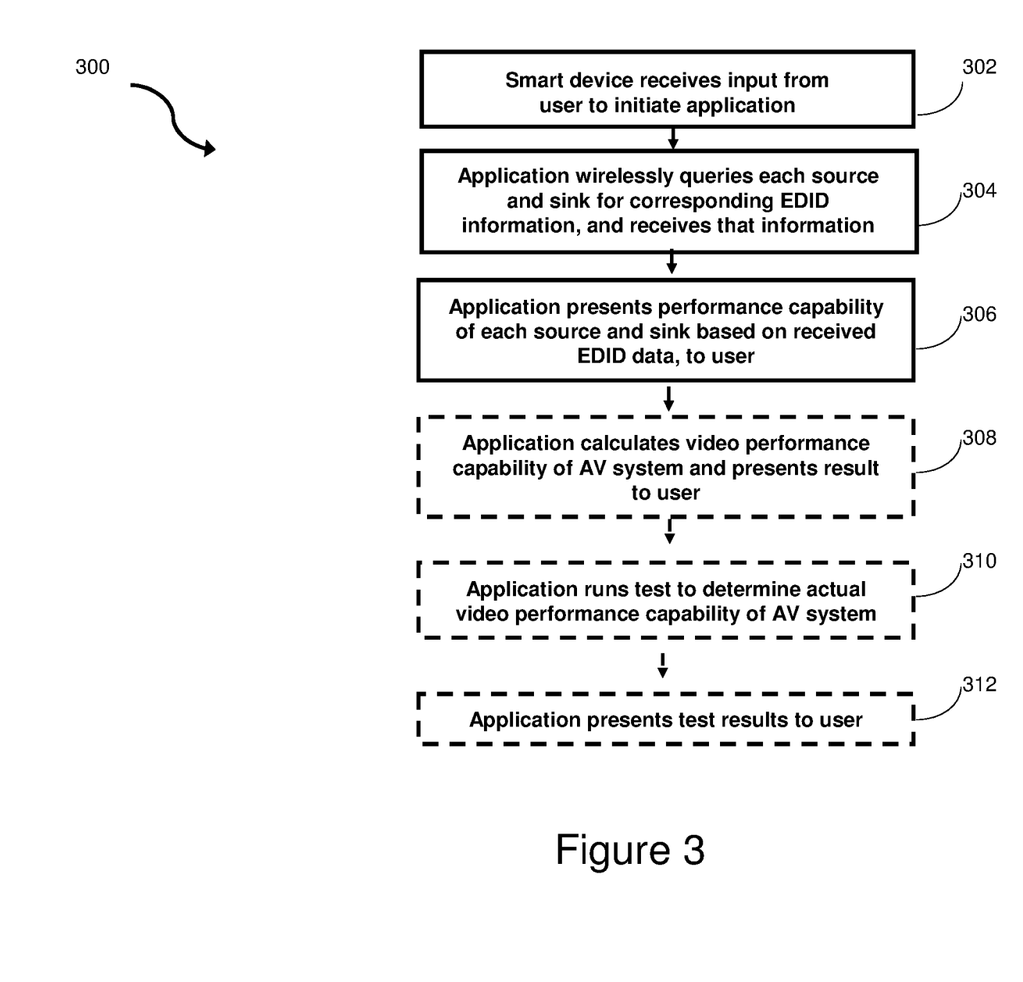
FIG. 3 is a flowchart of a method for assessing HDMI performance capability of an AV system according to one embodiment.

FIG. 3 is a flowchart showing steps of a method 300 for assessing HDMI audio and video performance capability of an AV system, according to some embodiments. At step 302, a user provides input to a smart device to initiate an HDMI performance application, requesting an audio assessment, a video assessment or both. The application may have been installed in the smart device at some earlier time, or may be downloaded as a preliminary step (not shown, for simplicity) of method 300. As mentioned above with respect to the FIG. 1 system, sources and sinks may have corresponding preloaded or downloaded thin-client type applications. At step 304, the application wirelessly queries each source and sink of the corresponding type (audio, video or both) for corresponding EDID information and wirelessly receives that information. EDID information is a form of metadata describing the capabilities of the corresponding device—source or sink—in a format complying with a VESA industry standard. At step 304, the application reads that EDID information and presents it to the user as simply and clearly as possible at step 306. This is typically done visually using the smart device's own display.

Figure 4:
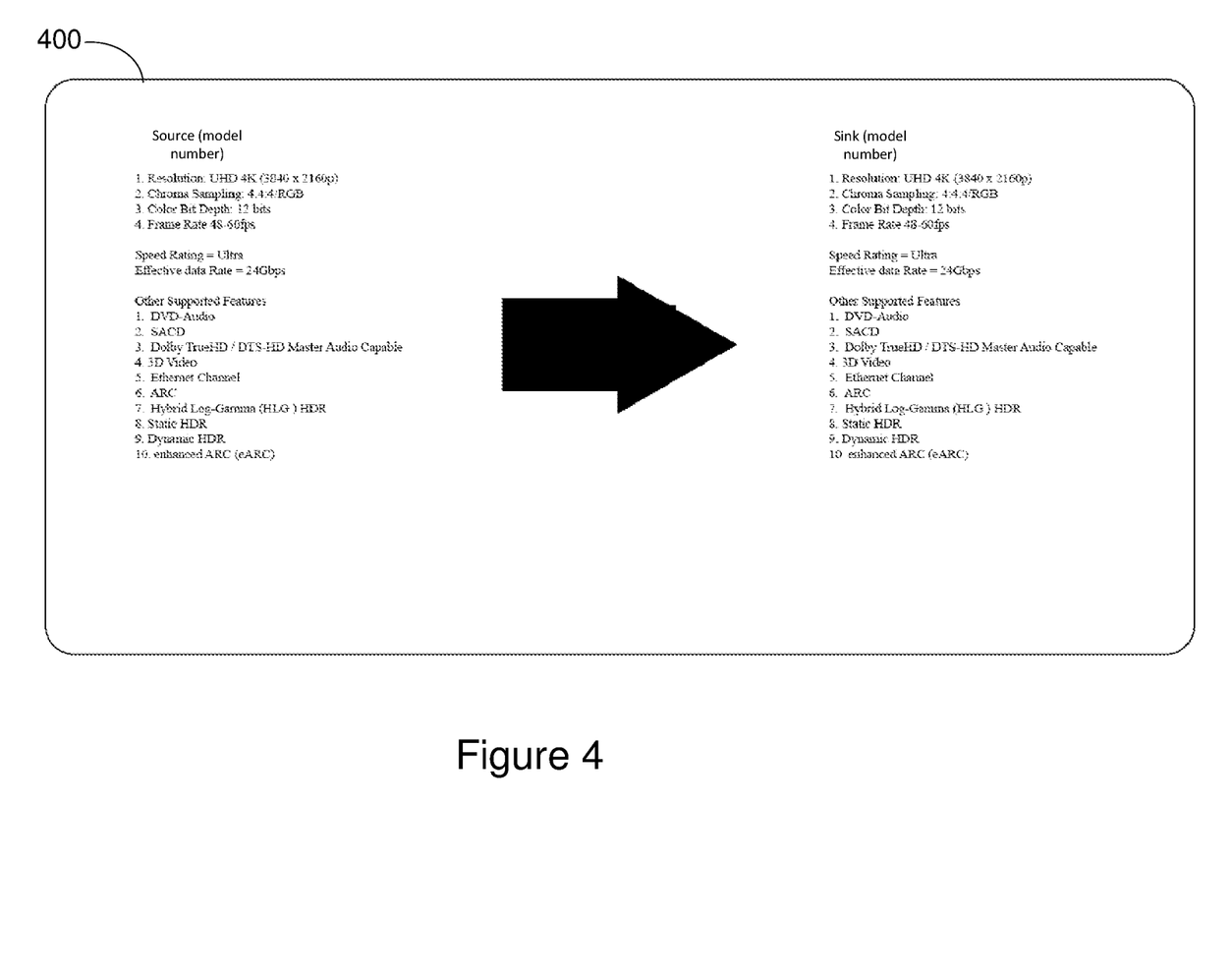
FIG. 4 is a screen display at one step of a method according to one embodiment.

FIG. 4 shows an example of how processed EDID information may be presented to the user as simple listings on the display screen 400 of a smart device. The information displayed typically includes values of resolution, chroma sampling, color bit depth, frame rate, speed rating and effective data rate, as well as additional features that the device is equipped to support. Tabular or more diagrammatic representations of the EDID information are other possible options. In this illustrated case, only a single source and sink are shown. In other cases, the screen may show corresponding EDID information for multiple sources and sinks in a system, Making the presentation clear for even a non-technical user to understand, and easy to take action on if necessary, is an important feature of embodiments of the present invention, as will be discussed further below.

In cases where the user is interested only in a simple audio and/or video assessment of performance capability of each audio source and sink in the system. method 300 may end when step 306 is completed. One further step (not shown in the figure, for simplicity) may be carried out in some of these situations, corresponding to a video-centric configured system, such as that of FIG. 1, in the particular case where the intermediate component (such as TV 108) only has ARC capability rather than eARC capability. In such cases, the application may provide a recommendation to the user that the system be reconfigured in an audio-centric configuration, such as that shown in FIG. 2, to achieve a better audio experience, possibly involving high end immersive audio technologies such as Dolby Atmos, DTS:X etc.

In cases where the user in interested in a more extensive audio and/or video assessment, however, method 300 proceeds to steps 308 through 312. In the following few paragraphs, the term "audio and/or video" is dropped as a qualifier of the words "test", "source" and "sink", so that, for example, reference simply to a (or the) test should be understood to apply to either type of test.

At step 308, the application uses the received and processed EDID information to calculate the performance capability of the system as a whole, determined at least in part by whichever sink or source in the system has the lowest data rate throughput capacity. The details of how the sources and sinks are interconnected may also have some influence, but the intrinsically slowest component can often be assumed to act as the bottleneck, limiting the speed of the system as a whole. The result of the calculation is presented to the user.

At step 310, the application performs a test, details of which will be described below, to determine the actual performance of which the system is capable. At step 312, the results of the test are presented to the user.

Figure 5:
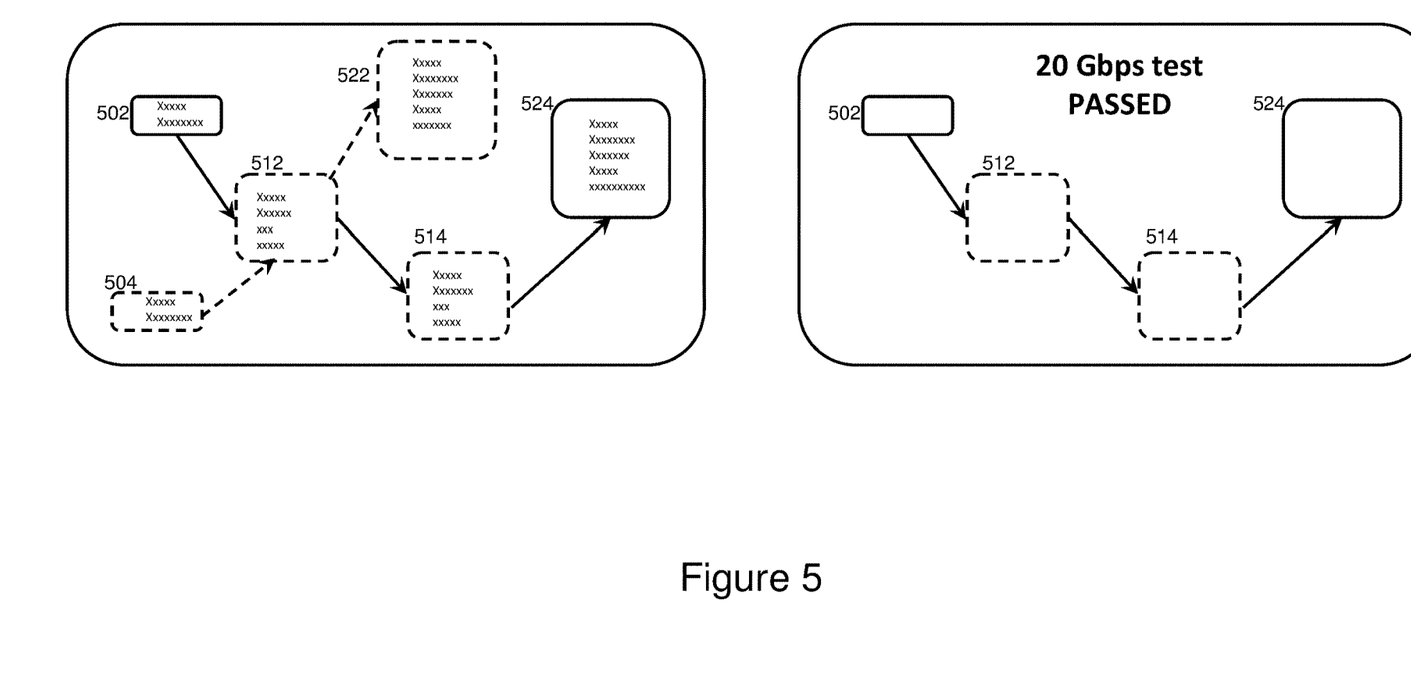
FIG. 5 shows screen displays at two steps of a method according to one embodiment.

FIG. 5 illustrates two screen displays on a smart device for one embodiment, in which the user may select a particular source and sink to be tested, and then receive the test result. The view on the left shows an EDID presentation offered at step 306, in the forms of a schematic representation of the system configuration. In the illustrated case, there are multiple sources (502, 504) sinks (522, 524) and intermediate components (512, 514), with source 502 and sink 524 having been selected for a test by the user, the selection being made by simply pressing on the corresponding icons on the screen. In the illustrated case, the application responds by changing the dashed icon outlines of the selected source and sink to solid ones, and by changing the dashed arrows connecting the source and sink and the relevant intermediate components to solid arrows.

The view on the right in FIG. 5 shows a presentation of the result of the subsequent test carried out by the application, as provided at step 312, for one simple test, In this case, a bold text message indicates to the user that for the particular system configuration illustrated, source 502 can successfully transmit and source 524 successfully receive and display a 20 Gbps data transmission, though the particular intermediate components 512 and 514 and Y.

In other test cases, where a sequence of test patterns is transmitted as described in detail below, the presentation of test results will of course include more than a simple pass/fail indication for one particular data rate. Such presentations may readily be envisaged, and are not shown here, for simplicity.

The diagrammatic presentation format illustrated in FIG. 5 is a simple intuitive example; other presentation formats—tabular ones, for example, or simple listings—may readily be envisaged, allowing the user to make the selection in different ways, such as by textual input, or responding yes or no to a suggested source/sink pairing by the application.

In some embodiments, not shown, the results of the calculation performed within step 308 may be withheld until after the experimental results of step 310 are obtained, and step 312 will be modified to present both sets of results to the user at one time.

The details of the testing performed at step 310 may be understood as a series of sub-steps or cycles, carried out automatically by system components under the control of the application, which itself may be controlled to some extent by the user. Video-testing will be described first, followed by audio testing.

At the first cycle, the application instructs a source in the system, such as primary source 104 or 204, to access a pre-loaded or downloadable video test pattern and transmits it through the system to a video sink, such as 108 or 206. The sink then sends a message back to the smart device confirming a pass or fail (i.e. reception and display of the test pattern with a quality deemed to be acceptable). While a single cycle may be useful in some circumstances, typically additional cycles will be carried out, involving transmission of a sequential series of test patterns, with a corresponding sequence of pass/fail indications to application running on the user's smart device. Details will be discussed further below, with reference to FIG. 5.

The test patterns may but need not be the same ones used during HDMI certification of the corresponding system components at manufacture. The test data streams preferably include challenging video clips in which parameters of resolution, color space, dynamic range, color gamut and frame rate may be systematically or pseudo-randomly varied, so that the quality of the system's capability in video transmission and display is thoroughly explored.

In some cases, the user may let the application select one or more default test patterns in a default sequence. In other cases, the user may make a more active choice, such as selecting a sequence that starts with a very simple pattern and progresses through increasingly challenging patterns, for example, or selecting particular patterns or video clips from a menu of options presented by the application. In yet other cases, the user may select a truncated version of a default sequence, choosing a start frame and an end frame, for example. In yet other cases, the user may have the option of selecting one specific test pattern to run, out of a list of options presented by the application. In all cases, once the user has provided such preliminary input, the application assumes control, and the user does not have to interact directly with any of the system components.

Figure 6:
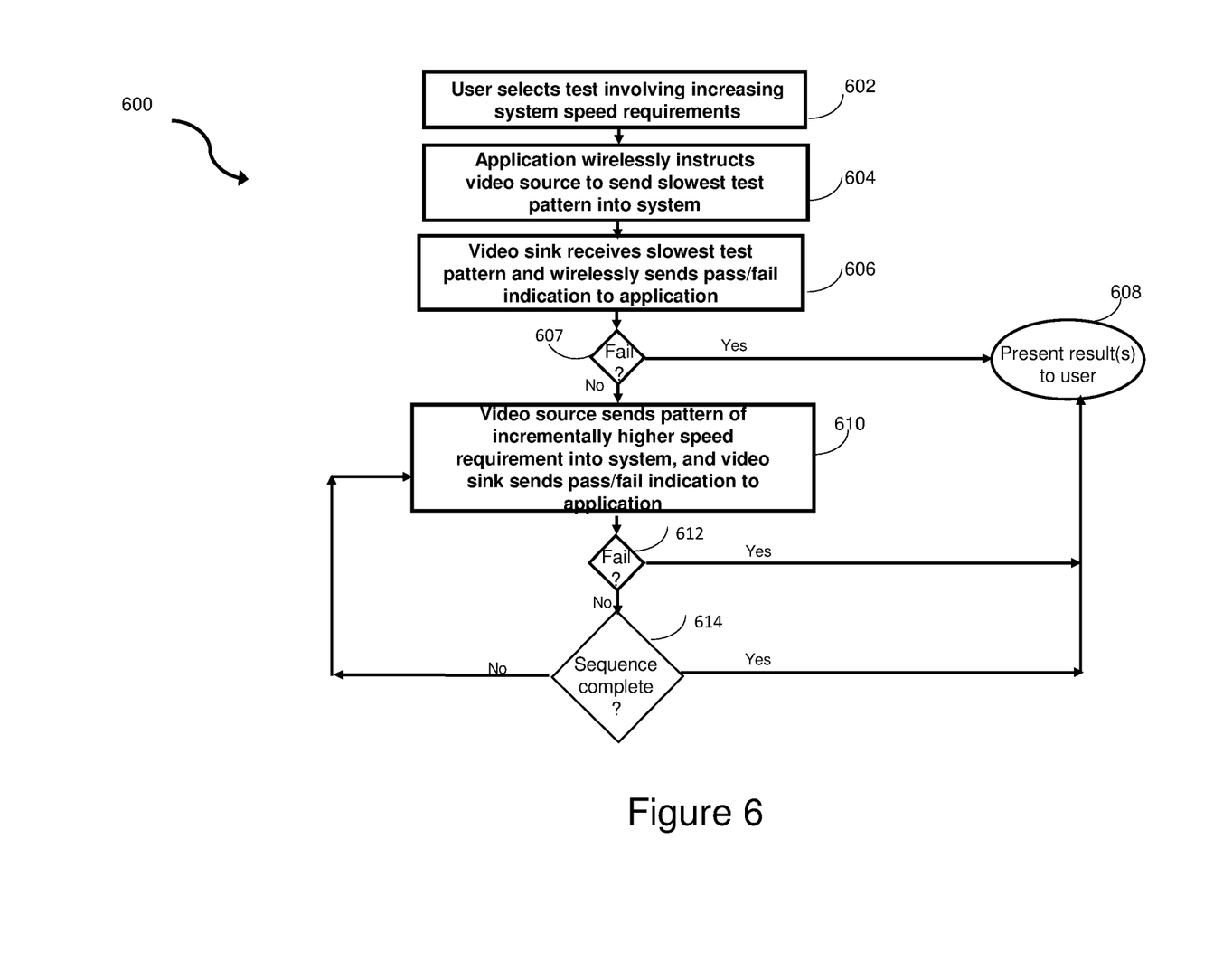
FIG. 6 is a flowchart of a method of performing tests on HDMI video performance of an AV system according to one embodiment.

An exemplary case is illustrated in FIG. 6. The test method 600 begins with step 502, where the user selects a video test, in this particular case one where speed requirements increase monotonically through a series of test patterns. At step 604, the application on the smart device interacts with a thin client application in a source in the AV system to request the source to send the slowest pattern in the selected series through the system. At step 606 a video sink in the system receives that slowest test pattern and a pass/fail indication is sent, using the sink's thin client application, to the application running on the user's smart device. If the pattern transmission is deemed a failure at step 607, the "fail" indication is the result presented to the user at step 608.

However, if the pattern transmission is deemed a success at step 607, which is typically the case in a first test "cycle" the method flow progresses to step 610, at which the source sends a pattern requiring a higher speed through the system, and the sink sends a corresponding pass/fail indication of receipt of that higher speed pattern. These actions may be done under the control of the smart device application, the thin client applications at the source and sink, or a combination of both. A fail indication at step 612 moves the method flow back to step 608, while a pass moves the method to step 614 where it is determined whether there is another available pattern in the selected series. If there is, the next cycle in initiated, in which the next pattern of even higher speed is sent through the system at a return to step 610. The iterations continue until either a failure occurs at step 612, or step 614 determines that the fastest available pattern in the series has been sent. In either case, the complete results obtained up to that point are presented to the user at step 608.

FIG. 6 illustrates just one of many possible test scenarios. In another case, it may make sense for the user to select a sequence to run in the opposite direction, from the fastest to the slowest, to save total test time. In yet other cases, the user may ask the application to run the sequence first in one direction and then the opposite direction, to check for hysteresis. Many other options may be envisaged.

Discussion of the above embodiments have all concerned video testing. Aspects of audio testing details are roughly analogous. Instead of video data, audio test streams may be sent from an audio source in the system to an audio sink in the system. While audio streams are low-bite rate compared to video, they may still be a useful way to check the capability of a system, and may, for example, allow the user to establish what type of streams (i.e., Dolby Atmos, DTS:X, Auro 3D, etc) can be handled well with given system components in a given configuration.

After step 312 in FIG. 3, corresponding to step 608 in FIG. 6, where the user is presented with simple pass/fail indications of the particular video and/or audio test performed, the application typically presents the user with additional recommendations or guidance. Typical options that may be offered to the user are as follows:

Accept a speed that works for the system.

Try a new cable and rerun the testing.

Change connection scheme (i.e. from audio to video centric) and rerun.

Connect to representative of company supplying the system or components of the system, and discuss additional options.

Run the test again with a different source, or a different sink.

Supplying this sort of help after testing, to interpret the results and act on them is a valuable benefit afforded by embodiments of the present invention.

In conclusion, embodiments of the present invention may be characterized as tools that allow the user to obtain as much relevant information as possible, presented in the simplest, clearest terms, so that the user can first judge whether an issue needs to be fixed, and then, if so, can make a reasonable decision on how to fix it. One can envisage this sort of diagnostic capability being used by custom HDMI AV system installers, as well as by "do it yourself-ers" with very little subject-specific knowledge or expertise. The lack of reliance on technology beyond that of a smart device that is almost certainly already in the user's possession is a particularly attractive feature.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of assessing at least one of audio and video High-Definition Multimedia Interface (HDMI) performance capabilities of an audiovisual (AV) system including one or more sources and one or more sinks, interconnected in a first configuration, the method comprising:

wirelessly connecting a smart device to the AV system; and using an app running on the smart device to:

receive, at the smart device, Extended Display Identification (EDID) data from each source and sink in the AV system, use the received EDID data to determine audio and/or video performance capability information for each source and sink;

present the determined performance capability information to a user of the system;

use the received EDID data to identify a source or sink in the AV system having a data handling capacity lower than a data handling capacity of any other source or sink in the AV system; notify the user of the data handling capacity of the identified source or sink as the maximum theoretical data handling capacity of the AV system;

run a test to assess actual data handling capacity of the AV system in the first configuration; and present one or more results of the test to the user.

2. A method of assessing at least one of audio and video High-Definition Multimedia Interface (HDMI) performance capabilities of an audiovisual (AV) system including one or more sources and one or more sinks, interconnected in a video centric configuration, centered on a video component, the method comprising:

wirelessly connecting a smart device to the AV system; and using an app running on the smart device to:

receive, at the smart device, Extended Display Identification (EDID) data from each source and sink in the AV system, use the received EDID data to determine audio performance capability information for each source and sink;

present the determined audio performance capability information to a user of the system;

establish, based on the determined audio performance capability information, whether audio quality achievable by the AV system would be improved by changing the video centric configuration to an audio centric configuration, centered on an audio component; and for each instance where audio quality achievable by the AV system would be improved by changing the video centric configuration to the audio centric configuration, provide a recommendation to the user to reconfigure the AV system to that audio centric configuration.

3. An apparatus for assessing at least one of audio and video High-Definition Multimedia Interface (HDMI) performance capabilities of an audiovisual (AV) system including one or more sources and one or more sinks, interconnected in a first configuration, the apparatus comprising:

one or more processors in a smart device wirelessly connected to the AV system; and a software app encoded in one or more computer-readable media for execution by the one or more processors and when executed operable to:

receive, at the smart device, Extended Display Identification (EDID) data from each source and sink in the AV system, use the received EDID data to determine audio and/or video performance capability information for each source and sink;

present the determined performance capability information to a user of the system;

use the received EDID data to identify a source or sink in the AV system having a data handling capacity lower than a data handling capacity of any other source or sink in the AV system; notify the user of the data handling capacity of the identified source or sink as the maximum theoretical data handling capacity of the AV system;

run a test to assess actual data handling capacity of the AV system in the first configuration; and present one or more results of the test to the user.

* * * * *